(12) United States Patent
Derome, Jr. et al.

(10) Patent No.: US 7,107,023 B1
(45) Date of Patent: Sep. 12, 2006

(54) DUAL-MODE TRANSMITTER

(75) Inventors: George E. Derome, Jr., Marshfield, MA (US); Henry B. Wallace, 562 Oak Hill Rd., Fincastle, VA (US) 24090

(73) Assignees: Henry B. Wallace, Marshfield, MA (US); George E. Derome, Marshfiled, MA (US)

( * ) Notice: Subject to any disclaimer, the term of this patent is extended or adjusted under 35 U.S.C. 154(b) by 0 days.

(21) Appl. No.: 09/382,763

(22) Filed: Aug. 25, 1999

(51) Int. Cl.
*H04B 1/02* (2006.01)

(52) U.S. Cl. .................. 455/103; 455/147; 455/521
(58) Field of Classification Search ......... 455/103–110, 455/108, 421, 113, 147, 118, 205, 116, 102, 455/521, 180.3, 180.1, 183.1, 61, 59, 93, 455/99, 124, 125; 340/905, 539, 902, 904; 375/41, 43, 61, 268, 270, 230, 350, 300, 375/321, 219; 370/527, 529, 320, 336, 342, 370/343
See application file for complete search history.

(56) References Cited

U.S. PATENT DOCUMENTS

| 3,624,507 | A | * | 11/1971 | Fukata | ......................... 325/45 |
| 3,660,811 | A | | 5/1972 | Vail et al. | |
| 3,710,313 | A | | 1/1973 | Kimbal et al. | |
| 3,760,349 | A | | 9/1973 | Keister et al. | |
| 4,238,778 | A | | 12/1980 | Ohsumi | |
| 4,443,790 | A | * | 4/1984 | Bishop | ......................... 340/539 |
| 4,468,813 | A | | 8/1984 | Burke et al. | |
| 4,587,522 | A | | 5/1986 | Warren | |
| 4,764,978 | A | * | 8/1988 | Argo et al. | ..................... 455/1 |
| 4,794,394 | A | | 12/1988 | Halstead | |
| 5,125,100 | A | * | 6/1992 | Katznelson | ................. 455/6.1 |
| 5,162,763 | A | * | 11/1992 | Morris | ....................... 332/170 |
| 5,289,194 | A | * | 2/1994 | Schlosser | ..................... 342/378 |
| 5,465,396 | A | * | 11/1995 | Hunsinger et al. | ............ 455/61 |
| 5,602,868 | A | * | 2/1997 | Wilson | ....................... 375/219 |
| 5,635,921 | A | * | 6/1997 | Maxwell | ..................... 340/902 |
| 5,808,560 | A | | 9/1998 | Mulanax | |
| 5,889,475 | A | * | 3/1999 | Klosinski et al. | ........... 340/902 |
| 6,188,891 | B1 | * | 2/2001 | Fujiki et al. | ................. 455/421 |

\* cited by examiner

*Primary Examiner*—Edward F. Urban
*Assistant Examiner*—C. Chow
(74) *Attorney, Agent, or Firm*—Stephen G. Matzuk

(57) ABSTRACT

An emergency and non-emergency transmitter receivable by broadcast band receivers in nearby vehicles, comprising a first signal generator for simultaneously providing a plurality of selectively spaced carriers having frequency spacings corresponding to the individual channels of the band to be covered and selectively providing amplitude modulation when used for the AM broadcast band, and a second signal generator providing an FM modulated signal, which when combined with the signal from the first signal generator, covers various portions of the FM broadcast band to provide complete coverage thereof. A plurality of signals are generated in a portion of a selected band and modulated, according to the selected band mode, with a pre-stored and selectable voice alarm message. The portion of the band is changed to provide coverage of the entire broadcast band, the broadcast band is also changed, and/or the message is changed to provide effective emergency notification to vehicles and/or listeners within a half-mile radius of the emergency vehicle or public facility issuing the alarm transmission.

22 Claims, 4 Drawing Sheets

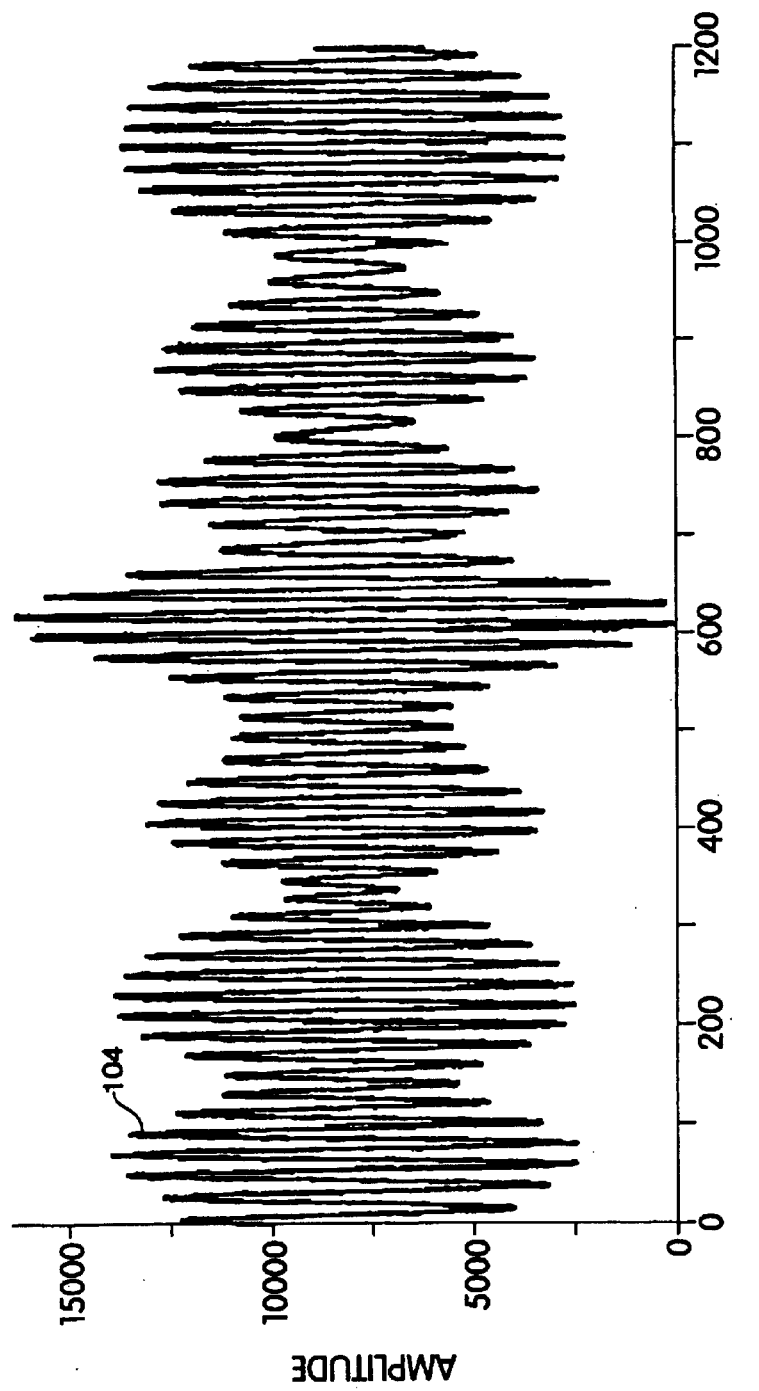

DUAL-MODE TRANSMITTER

FIELD OF THE INVENTION

The present invention relates to emergency and non-emergency transmitters, in particular, to dual-mode transmitters for short-range override of commercial broadcast in moving vehicles.

BACKGROUND OF THE INVENTION

Emergency vehicles, responding to accidents or fires, and police in pursuit often pose heightened danger to those involved at the focus of the emergency and to the population around and moving toward the scene of the emergency. Typically, the surrounding population may be completely unaware of the potential dangers approaching them or towards which they are moving, and unnecessarily place themselves at risk of injury, and potentially interfere with the emergency response. Furthermore, if they are unaware in the events outside their vehicle and are instead involved with entertainment from local radio broadcast, they will further delay taking appropriate evasive or defensive action.

Simple tone-modulated warning transmitters which sweep the broadcast bands often sounds like common man-made interference, offering insufficient information to the listener to determine that there is an emergency and what action could or should be taken. Moreover, if the listener cannot determine that an emergency exist, such simple warning systems will only distract and annoy the listeners, causing them to be even less responsive to the nearby emergency. Also, the sweep or stepping of a single carrier through the broadcast band(s) favors simple alarm tone modulation as alarm voice messages would never be heard in their entirety if complete coverage of the broadcast band(s) by a single swept carrier is to be provided in reasonable time.

Full band transmissions which saturate the entire broadcast band(s) require significant amounts of carefully controlled radiated power to be effective at any one frequency. Moreover, in the event of multiple emergency vehicles responding to the same emergency, each emitting the same full-band alarm signal will cause interference when they are in or near the same location, and thus cancel each other or cause confusion to those receiving the full band alarm signal, thereby increasing rather than reducing the danger to the nearby population.

Further exemplary applications of the present invention include, but are not limited to, providing short-range broadcast of vehicle alert signals from school busses to reduce risks when loading and unloading children, and broadcast municipal or civic information, such as and parking area information.

SUMMARY OF THE INVENTION

The alarm transmitter according to the present invention comprises a first signal generator for simultaneously providing a plurality of selectively (e.g. regularly or arbitrarily) spaced carriers having frequency spacings corresponding to the individual channels of the band to be covered and selectively providing amplitude modulation when used for the AM broadcast band, and a second signal generator providing an FM modulated signal, which when combined with the signal from the first signal generator, covers various portions of the FM broadcast band to provide complete coverage thereof. Thus, the present invention provides a frequency-agile, multi-carrier, multi-mode and multi-band alarm transmitter having a selectable voice message which overrides broadcast signals as received by vehicle listeners in the vicinity of vehicles responding to the emergency, or otherwise receiving special municipal information.

A plurality of signals are generated in a portion of a selected band and modulated, according to the selected band mode, with a pre-stored and selectable voice alarm message(s). According to the present invention, the portion of the band is changed to provide coverage of the entire broadcast band, the broadcast band is also changed, and/or the message is changed to provide effective emergency notification to vehicles and/or listeners in proximity (up to a maximum legal range) of the responding emergency vehicle issuing the alarm transmission.

BRIEF DESCRIPTION OF THE DRAWING

These and further features of the present invention will be better understood by reading the following Detailed Description together with the Drawing, wherein

FIG. 2A and 2B are time-domain plots of non-optimized and optimized waveforms, respectively, relevant to the first signal generator of the embodiment of FIG. 1.

DETAILED DESCRIPTION OF THE INVENTION

Figure 1:
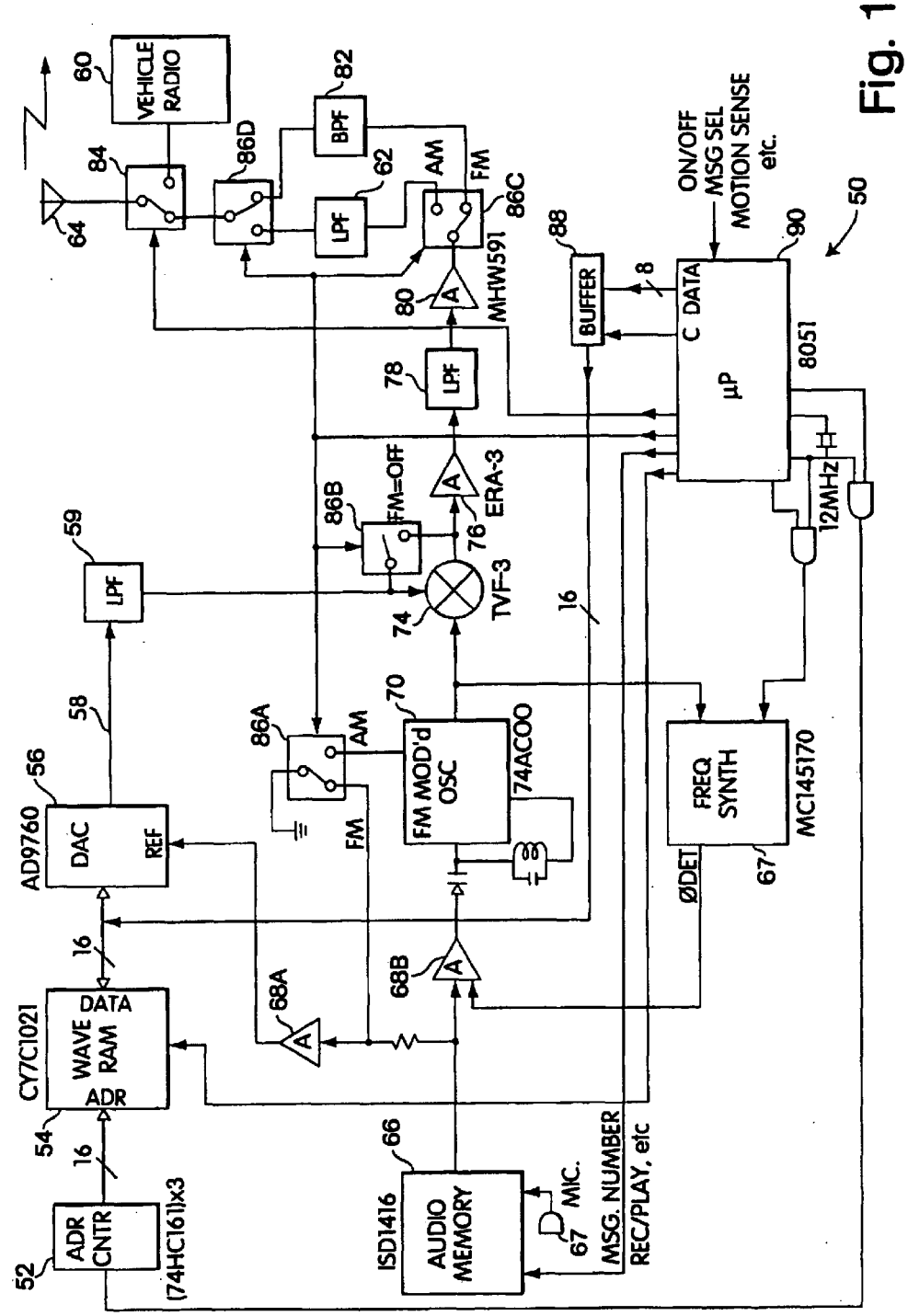
FIG. 1 is a block diagram of one embodiment of the present invention.

One embodiment 50 of the alarm transmitter according to the present is shown in FIG. 1, wherein an Amplitude Modulated (AM) signal is provided which has frequency components substantially coinciding with the individual channel frequencies in the AM broadcast band and in sufficient plurality to cover substantially the entire AM broadcast band.

A wave shape, preselected for particular spectral components is loaded into a wave RAM 54 from the microprocessor 90 via buffer 88 when the transmitter is prepared for transmission into a particular broadcast band. The data output from the wave RAM 54 is received by a digital-to-analog converter 56 which provides an analog output signal having the desired frequency components, and provides amplitude modulation (via the DAC reference signal input) according to an analog message signal received.

The analog message signal is provided by an analog audio memory (or equivalent) such as an ISD1416, which provides one or more pre-stored or recordable voice, tone or other audible messages as controlled by the microprocessor 90. In addition, a microphone 67 signal may be substituted by manual switch override (not shown) for broadcast of explicit emergency directions or other information.

The wave RAM 54 is clocked (sequentially addressed by counter 52) at a high rate, e.g. at least several MHz when enabled by the microprocessor 90 to provide a DAC 58 signal output in the range of interest, e.g. 100 KHz to 4 MHz in the present embodiment. A low-pass filter 59 (Fc=4 MHz) follows to remove any incidental spurious signals from the DAC 56 output.

According to this embodiment of the present invention, the waveform stored in the wave RAM 54 is clocked at a substantially constant rate, yet produces a DAC 56 output signal having selected frequency components which substantially coincide with selected AM channels (e.g. every 10

KHz) over substantially the entire AM broadcast band. Alternate embodiments provide segmenting the AM broadcast band into multiple, periodically selected band sections comprising contiguous blocks of frequency components for contiguous channels, for interleaved groups of frequencies (e.g. every other band channel) or for combinations thereof, and may be provided by selected waveforms stored in the wave RAM 54. In the embodiments providing alternating groups of frequencies, another specified waveform is loaded into the wave RAM 54 for the selected corresponding frequency set.

Figure 2A:
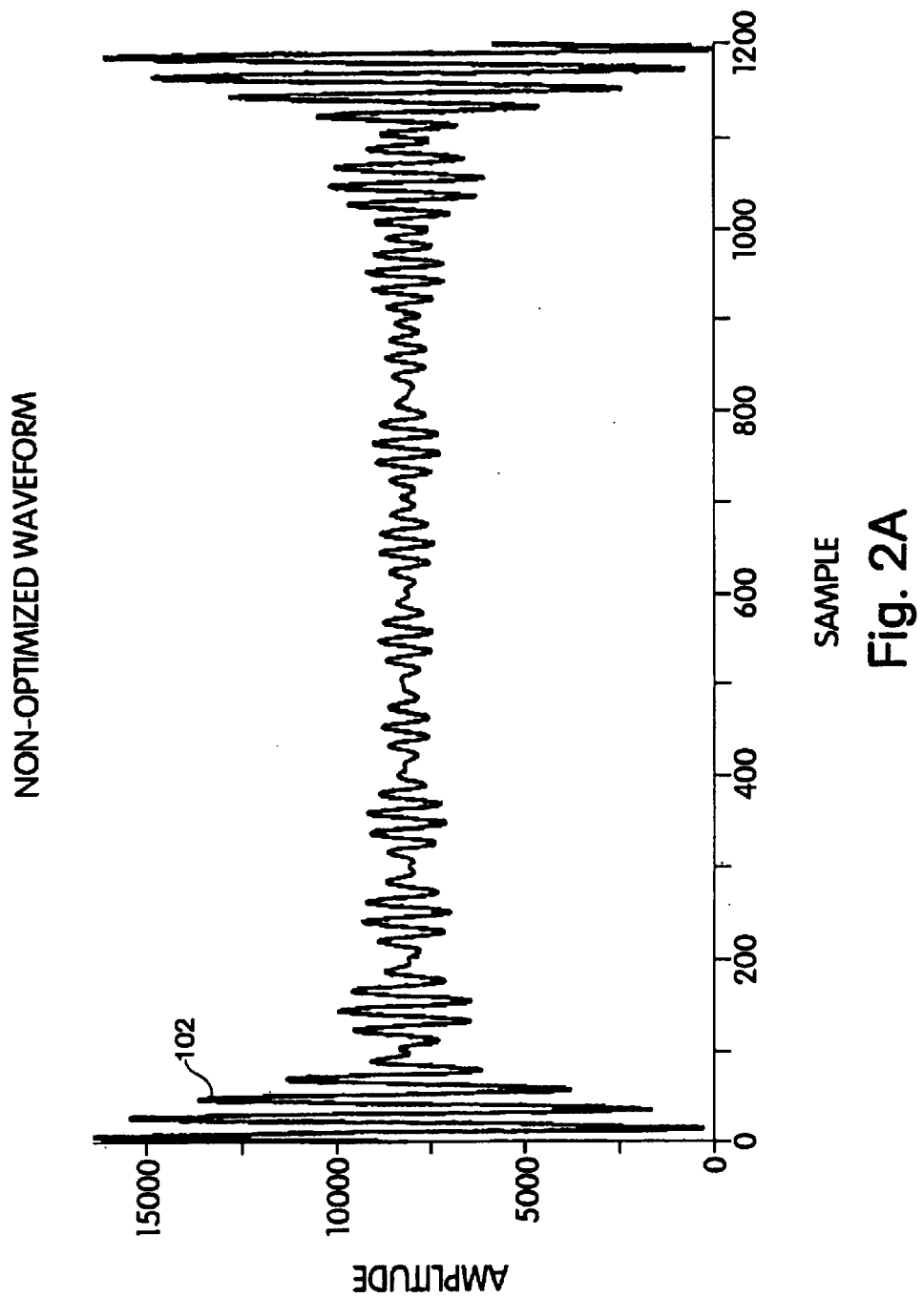

The exemplary wave shape providing the desired frequency composition (e.g. at the broadcast band channel and spacing frequencies), as exemplified by waveform 102 has a crest factor (ratio of maximum to minimum signal, e.g. 4.8 for FIG. 2A) provides undesired modulation clipping and other non-linearities resulting in undesired intermodulation products, wasting energy at the transmitted output and providing spurious spectral output which would require additional filtering to remove or reduce such unwanted spectral components to acceptable levels. According to the present invention, the exemplary waveform 104 has adjusted carrier phase relationships to provide the desired output signals and provide a markedly improved crest factor (e.g. from 4.8 to 2.6 for the waves shown) to reduced transmitted signal intermodulation products and to spread the remaining intermodulation products over a wider band of frequencies at a lower amplitude.

According to the present invention, the set of carriers to be produced is selected (to coincide with the desired band frequencies) as a sum of sine waves. Then, the phase of each wave is changed randomly in a Monte Carlo-style process. After each set of random changes to each set of carriers, a figure of merit (e.g. amplitude variance) is computed. The figure of merit is computed by dividing a trial waveform into segments (e.g. ten) in the time domain, and the RMS voltage is computed for each of the segments. The statistical variance (i.e. the figure of merit) is computed for the set of RMS voltages, and minimized to spread the energy in the waveform evenly in the time domain. The process repeats until the figure of merit ceases to improve significantly. Thus the crest factor is reduced, providing a 20 dB to 40 dB reduction in the peak amplitudes of the intermodulation products outside the frequency range of the set of carriers being produced, depending on the spacing of the carriers and results of the optimization process.

Alternate embodiments according to the present invention provide a wave shape further optimized by varying randomly the center frequencies of each carrier by a small amount (e.g. 0.1% to 1.0%), which further spreads out the intermodulation products, yielding an additional 5–10 dB reduction in the peak value of each intermodulation product in some frequency regions. Moreover, the small variation in center frequency is insignificant to the reception of the transmitted signal.

The amplitude-modulated signal provided by the DAC 56 is amplified by amplifiers 76, 80 and sent via switch 86B, or via the mixer 74 with the oscillator 70 disabled, to the antenna 64 via switches 86C and 86D, and low-pass filters 80 and 62 (Fc=1.2/1.6 MHz) to restrict the radiated power to the (AM) band to be covered. The amplifiers 76, 80 are typically IC or discrete components selected to provide a sufficient AM power output, i.e. several hundred milliwatts in this embodiment.

A frequency modulated multi-carrier alarm signal is provided in the present embodiment 50 by loading the wave RAM 54 with a signal having frequency components which coincide to multiples of the FM broadcast band channel spacing, e.g. 200 KHz in the U.S., and a sufficient bandwidth to cover a substantial portion of the FM band, e.g. 4 MHz and having the desired crest factor as described, above. The DAC 56 output signal is received by a mixer which also receives a selectable frequency signal from a frequency synthesizer, comprising a voltage controlled oscillator (VCO) 70, amplifier 68B and frequency synthesizer divider and phase detector 72, as controlled by the microprocessor 90. The mixer 74 provides both upper and lower sidebands from the signals mixed. For example, a 4 MHz wide signal (from DAC 56) and a 92.1 MHz signal from the VCO 70 provides a broad group of signals within the range of 88.1–96.1 MHz, thereby covering a substantial portion of the FM band. The frequency synthesizer is then adjusted by the microprocessor 90 to provide a higher frequency signal, e.g. 98 MHz to provide a mixer 74 output signals in the range of 94.1–102.1 MHZ, and then a final VCO frequency e.g. 104 MHz to provide coverage of the remaining 100.1–107.9 MHz portion of the FM band, with overlap (as illustrated) if desired.

The many signals from the mixer 74 within the portion (e.g. 8 MHz wide) of the FM band are all simultaneously frequency modulated by adding an audio signal from the audio memory 66 to the amplifier 68B which also receives the phase detector (error) signal used within the frequency synthesizer circuit.

The FM signals from the mixer 74 are received by the antenna 64 via switches 86C and 96D after sufficient amplification by amplifiers 76, 80 and filtering by low-pass (Fc=120 MHz) and band-pass filters (80–120 MHz), 78 and 82 respectively, to provide an acceptable FM transmitted signal of several hundred milliwatts power, in the present embodiment of FIG. 1. While the present embodiment incorporates wide-band, linear amplifiers 76, 80 for both the AM and FM bands, alternate embodiments may comprise separately configured amplifiers for the respective band and mode of modulation.

When the radiated AM/FM signal is radiated by a single antenna shared with a radio, e.g. 60, the antenna 64 is selected by switch 84 to provide the transmitted signal according to a control unit 90 signal. When AM band coverage is desired, switches 86A and 86B disable the FM signal from proceeding by grounding, and when FM band coverage is desired, the AM signal is inhibited, or grounded as shown, at points in the signal path, such as before the power amplifiers 60 and 80 and elsewhere, which prevent emission of the AM signal and prevent AM modulation of the DAC 56 output.

Figure 3:
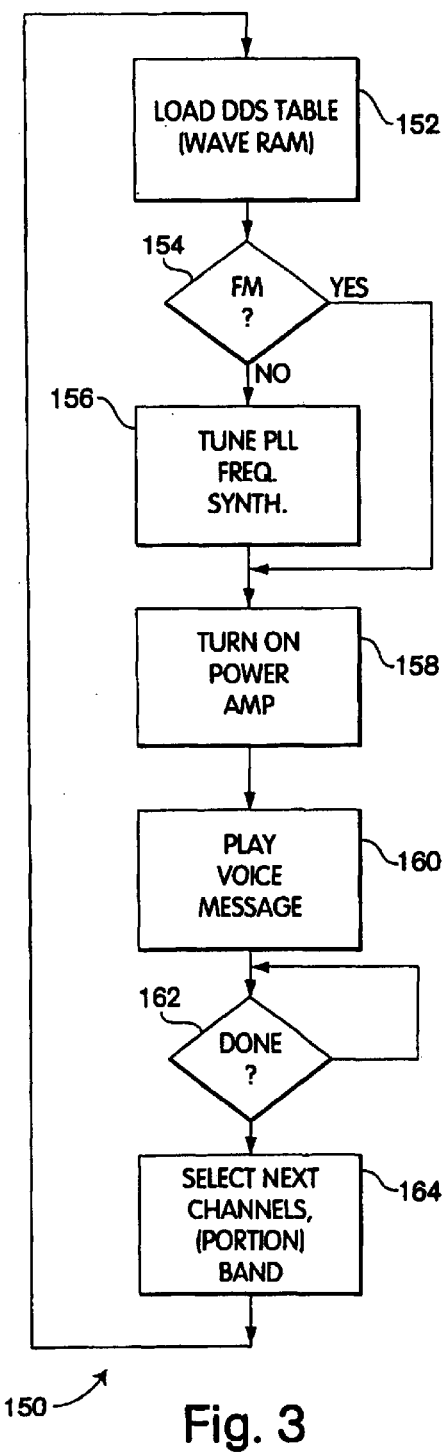
FIG. 3 is a flow chart of the program operating in the controller according to the embodiment of FIG. 1.

The selection of the predetermined waveform for the corresponding AM or FM band or band segment is determined at step 152 by the microprocessor 90 according to a sequential operation illustrated by the flowchart 150 shown in FIG. 3. If the band or band portion is in the FM band, step 154, the Phase-Locked Loop frequency synthesizer is tuned at step 156 for the appropriate frequency as discussed above. The FM power amplifier 80 is enabled at step 158 and the voice (audio) message is selected and begun at step 160, When it is finished, step 162, the next set of frequencies is selected at step 164. According to the preferred embodiment, the selection of the various AM and FM band or band portions is selected in a permutation to provide non-sequential band coverage, yet frequently enough to, provide a message to all portions of the AM and FM broadcast band. In the present embodiment, the transmitter according to the present invention provides complete coverage of the U.S.

AM and FM broadcast bands within 9 seconds for a 1.5 second message with each of the two bands covered in thirds.

While the present embodiment is implemented partially in analog and partially in digital circuitry, alternate embodiments which include corresponding equivalent digital (e.g. a digital audio memory and/or amplitude modulator, etc.) or analog circuitry (e.g. a portion of the control unit, or wave RAM, etc.) are also within the scope of the present invention. Modifications and substitutions of the present invention by one of ordinary skill in the art are within the scope of the invention, which is not to be limited except by the claims which follow.

What is claimed is:

1. A transmitter, comprising:
   a multi-signal generator for simultaneously providing a plurality of signals within a portion of a selected frequency band and having a center frequency and relative frequency spacing of said simultaneous plurality of signals, wherein
      said multi-signal generator is a variable multi-signal generator for selectively adjusting said center frequency to cause said plurality of signals to cover differing portions of the selected frequency band;
   a modulator connected to said multi-signal generator for selectively and simultaneously modulating said plurality of signals; and
   a control unit for selectively controlling said multi-signal generator center frequency.

2. The transmitter of claim 1, wherein said multi-signal generator further includes a wave memory for reproducing a selected waveform output signal providing said plurality of signals.

3. The transmitter of claim 2, wherein said wave memory output signal comprises a plurality of signals corresponding to a different portion of said selected band.

4. The transmitter of claim 3, wherein said control unit provides prestored waveforms selectively transferred to said wave memory to provide said plurality of signals on a corresponding portion of said selected band.

5. The transmitter of claim 2, further including a waveform converter connected to receive said reproduced selected waveform output signal and provide a converted output signal.

6. The transmitter of claim 5, further including an audio source comprising one of an audio memory for providing a prestored audio signal selected by said control unit, and a microphone, said audio source being selectively connected to said converter to therein amplitude modulate the waveform output signal.

7. The transmitter of claim 2, further including a programmable signal generator providing a programmable output signal and a mixer receiving said programmable output signal and said converted output signal and providing a mixer output therefrom, wherein said programmable output signal is selectively varied to provide a plurality of signals at different portions of a selected band.

8. The transmitter of claim 7, wherein said programmable signal generator is controlled by said control unit to selectively provide different output signals, which when received by said mixer, provides said plurality of signals corresponding to substantially all of said selected frequency band.

9. The transmitter of claim 8 further including a frequency modulator connected to said programmable signal generator for frequency modulating the output signal thereof according to an audio signal.

10. The transmitter of claim 9 further including an audio source comprising one of an audio memory for providing a prestored audio signal selected by said control unit, and a microphone, said audio source being selectively connected to said frequency modulator to modulate programmable signal generator output signal.

11. The transmitter of claim 10, further including an audio source comprising one of an audio memory for providing a prestored audio signal selected by said control unit, and a microphone, said audio source being selectively connected to said frequency modulator.

12. The transmitter of claim 7, further including a power amplifier selectively receiving from one of said mixer output signal and said converted signal, and providing a transmitter output signal.

13. A dual-mode transmitter, comprising:
   a first signal generator for simultaneously providing a plurality of carrier signals within a frequency band and having a relative frequency spacing, and including an amplitude modulator of said plurality of said plurality of signals according to a modulation signal;
   a second signal generator for selectively providing a selectable frequency signal, and including a frequency modulator of said selectable frequency according to a modulation signal;
   a mixer receiving the output signals of said first and second signal generators, and providing an output signal;
   a power amplifier for selectively receiving said signals corresponding to said plurality of signals from said first signal generator and said mixer output signal, providing a signal to an antenna according to said selectively received signal; and
   a control means for selectably enabling said first signal amplitude modulator in a first mode, and said second signal generator frequency modulator in a second mode.

14. The transmitter of claim 13, further comprising an audio source comprising one of an audio memory for providing a prestored audio signal selected by said control unit, and a microphone, said audio source being selectively connected to said amplitude modulator and said frequency modulator.

15. The transmitter of claim 13, wherein said first signal generator comprises means for providing a plurality of signals in selected portions of said frequency band according to said control unit wherein said selected portions substantially comprise said frequency band.

16. The transmitter of claim 13, wherein said first signal generator comprises means for providing a plurality of signals in at least one selected portion of said frequency band according to said control unit, and
   said second signal generator provides said selectable frequency signal according to said control unit,
   wherein said mixer output signals comprise selected portions which substantially comprise said frequency band.

17. A method of providing simultaneous multi-carrier transmission, comprising the steps of:
   selecting a set of carrier frequencies;
   providing a corresponding sum of sine wave signals each corresponding to one of the set of carrier frequencies;
   dividing the sum into a number of segments in the time domain;
   calculating a variance of the magnitudes of each said segment;
   changing the phase relationship of said sine wave signals to minimize the variance;

repeating the steps of calculating and changing until the minimization of the variance from said changes is less than a desired threshold significance value; and transmitting a signal corresponding to said sum of said sine wave signals.

18. The method of claim 17, wherein said step of changing comprises the step of randomly changing the phase relationship of said sine wave signals.

19. The method of claim 17, wherein said step of selecting a set of carrier frequencies comprises the step of selecting a set of carrier frequencies corresponding to allocated broadcast channels within a selected broadcast band.

20. The method of claim 19, wherein said selected broadcast band comprises at least one of commercial AM and FM broadcast band.

21. The method of claim 17, further including the step of modulating said signal corresponding to the sum of said sine wave signals.

22. The method of claim 17, further including the step of frequency translating said signal corresponding to the sum of said sine wave signals into at least a portion of a selected broadcast band.

* * * * *